(12) United States Patent
Shivadas et al.

(10) Patent No.: US 9,264,475 B2
(45) Date of Patent: Feb. 16, 2016

(54) USE OF OBJECTIVE QUALITY MEASURES OF STREAMED CONTENT TO REDUCE STREAMING BANDWIDTH

(71) Applicant: Sonic IP, Inc., Santa Clara, CA (US)

(72) Inventors: Abhishek Shivadas, San Diego, CA (US); William Amidei, La Jolla, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 13/731,972

(22) Filed: Dec. 31, 2012

(65) Prior Publication Data

US 2014/0201382 A1    Jul. 17, 2014

(51) Int. Cl.
*G06F 15/16* (2006.01)
*H04L 29/06* (2006.01)

(52) U.S. Cl.
CPC .......... *H04L 65/605* (2013.01); *H04L 65/4084* (2013.01); *H04L 65/80* (2013.01)

(58) Field of Classification Search
USPC ................................ 709/231, 232
See application file for complete search history.

(56) References Cited

U.S. PATENT DOCUMENTS

| | | | |
|---|---|---|---|
| 5,361,332 | A | 11/1994 | Yoshida et al. |
| 5,404,436 | A | 4/1995 | Hamilton |
| 5,841,432 | A | 11/1998 | Carmel et al. |
| 6,031,622 | A | 2/2000 | Ristow et al. |
| 6,155,840 | A | 12/2000 | Sallette |
| 6,195,388 | B1 | 2/2001 | Choi et al. |
| 6,389,473 | B1 | 5/2002 | Carmel et al. |
| 6,397,230 | B1 | 5/2002 | Carmel et al. |
| 6,658,056 | B1 | 12/2003 | Duruöz et al. |
| 6,807,306 | B1 | 10/2004 | Girgensohn et al. |
| 6,859,496 | B1 | 2/2005 | Boroczky et al. |
| 6,956,901 | B2 | 10/2005 | Boroczky et al. |
| 7,242,772 | B1 | 7/2007 | Tehranchi |
| 7,478,325 | B2 | 1/2009 | Foehr et al. |
| 7,991,156 | B1 | 8/2011 | Miller |
| 8,023,562 | B2 | 9/2011 | Zheludkov et al. |

(Continued)

FOREIGN PATENT DOCUMENTS

| | | |
|---|---|---|
| EP | 813167 A2 | 12/1997 |
| EP | 2486517 A1 | 8/2012 |

(Continued)

OTHER PUBLICATIONS

"Supported Media Formats", Supported Media Formats, Android Developers, Nov. 27, 2013, 3 pgs.

(Continued)

*Primary Examiner* — Vivek Srivastava
*Assistant Examiner* — Hermon Asres
(74) *Attorney, Agent, or Firm* — KPPB LLP

(57) ABSTRACT

A method includes identifying replaceable sections among first sections of video encoded at a first bitrate, and replacement sections of the video each encoded at a bitrate that is less than the first bitrate and having encoded therein the video of a corresponding one of the replaceable sections, each replacement section and the corresponding replaceable section having respective measured levels of objective quality that meet a predetermined criterion of objective quality. The method further comprises streaming the first sections of video except for the replaceable sections, and the replacement sections instead of the corresponding replaceable sections.

24 Claims, 13 Drawing Sheets

(56) References Cited

U.S. PATENT DOCUMENTS

| | | | |
|---|---|---|---|
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,291,460 B1 | 10/2012 | Peacock | |
| 8,311,115 B2 | 11/2012 | Gu et al. | |
| 8,321,556 B1 | 11/2012 | Chatterjee et al. | |
| 8,386,621 B2 | 2/2013 | Park et al. | |
| 8,412,841 B1 | 4/2013 | Swaminathan et al. | |
| 8,452,110 B2 | 5/2013 | Shoham et al. | |
| 8,456,380 B2 | 6/2013 | Pagan | |
| 8,472,792 B2 | 6/2013 | Butt | |
| 8,510,404 B2 | 8/2013 | Carmel et al. | |
| 8,805,109 B2 | 8/2014 | Shoham et al. | |
| 8,908,984 B2 | 12/2014 | Shoham et al. | |
| 9,014,471 B2 | 4/2015 | Shoham et al. | |
| 9,042,670 B2 | 5/2015 | Carmel et al. | |
| 2002/0136298 A1* | 9/2002 | Anantharamu | H04N 21/2402 375/240.12 |
| 2003/0002578 A1 | 1/2003 | Tsukagoshi et al. | |
| 2003/0152370 A1 | 8/2003 | Otomo et al. | |
| 2003/0231863 A1 | 12/2003 | Eerenberg et al. | |
| 2003/0231867 A1 | 12/2003 | Gates et al. | |
| 2003/0233464 A1* | 12/2003 | Walpole | H04L 29/06 709/231 |
| 2003/0236836 A1 | 12/2003 | Borthwick | |
| 2003/0236907 A1 | 12/2003 | Stewart et al. | |
| 2004/0136698 A1 | 7/2004 | Mock | |
| 2004/0158878 A1 | 8/2004 | Ratnakar et al. | |
| 2005/0038826 A1 | 2/2005 | Bae et al. | |
| 2005/0114896 A1 | 5/2005 | Hug et al. | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | Zoest et al. | |
| 2005/0207578 A1 | 9/2005 | Matsuyama et al. | |
| 2005/0273695 A1 | 12/2005 | Schnurr | |
| 2005/0275656 A1 | 12/2005 | Corbin et al. | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckx-Deleersnijder et al. | |
| 2007/0168541 A1 | 7/2007 | Gupta et al. | |
| 2007/0168542 A1 | 7/2007 | Gupta et al. | |
| 2007/0180125 A1 | 8/2007 | Knowles et al. | |
| 2007/0239839 A1 | 10/2007 | Buday et al. | |
| 2007/0271317 A1 | 11/2007 | Carmel et al. | |
| 2007/0292107 A1 | 12/2007 | Yahata et al. | |
| 2008/0101466 A1 | 5/2008 | Swenson et al. | |
| 2008/0120389 A1 | 5/2008 | Bassali et al. | |
| 2008/0126248 A1 | 5/2008 | Lee et al. | |
| 2008/0137736 A1 | 6/2008 | Richardson et al. | |
| 2008/0192818 A1 | 8/2008 | DiPietro et al. | |
| 2008/0195744 A1 | 8/2008 | Bowra et al. | |
| 2008/0256105 A1 | 10/2008 | Nogawa et al. | |
| 2008/0263354 A1 | 10/2008 | Beuque et al. | |
| 2008/0279535 A1 | 11/2008 | Haque et al. | |
| 2008/0310454 A1 | 12/2008 | Bellwood et al. | |
| 2008/0310496 A1 | 12/2008 | Fang et al. | |
| 2009/0031220 A1 | 1/2009 | Tranchant et al. | |
| 2009/0037959 A1 | 2/2009 | Suh et al. | |
| 2009/0048852 A1 | 2/2009 | Burns et al. | |
| 2009/0055546 A1 | 2/2009 | Jung et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0132824 A1 | 5/2009 | Terada et al. | |
| 2009/0150557 A1 | 6/2009 | Wormley et al. | |
| 2009/0169181 A1 | 7/2009 | Priyadarshi et al. | |
| 2009/0172201 A1 | 7/2009 | Carmel et al. | |
| 2009/0201988 A1 | 8/2009 | Gazier et al. | |
| 2009/0226148 A1 | 9/2009 | Nesvadba et al. | |
| 2009/0293116 A1 | 11/2009 | Demello et al. | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0040351 A1 | 2/2010 | Toma et al. | |
| 2010/0074324 A1* | 3/2010 | Qian et al. | H04L 47/10 375/240.02 |
| 2010/0083322 A1 | 4/2010 | Rouse | |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0158109 A1 | 6/2010 | Dahlby et al. | |
| 2010/0186092 A1 | 7/2010 | Takechi et al. | |
| 2010/0189183 A1 | 7/2010 | Gu et al. | |
| 2010/0228795 A1 | 9/2010 | Hahn | |
| 2010/0235472 A1 | 9/2010 | Sood et al. | |
| 2011/0047209 A1 | 2/2011 | Lindholm et al. | |
| 2011/0066673 A1 | 3/2011 | Outlaw | |
| 2011/0080940 A1 | 4/2011 | Bocharov | |
| 2011/0082924 A1 | 4/2011 | Gopalakrishnan | |
| 2011/0126191 A1 | 5/2011 | Hughes et al. | |
| 2011/0129011 A1 | 6/2011 | Cilli et al. | |
| 2011/0142415 A1 | 6/2011 | Rhyu | |
| 2011/0145726 A1 | 6/2011 | Wei et al. | |
| 2011/0149753 A1 | 6/2011 | Bapst et al. | |
| 2011/0150100 A1 | 6/2011 | Abadir | |
| 2011/0153785 A1 | 6/2011 | Minborg et al. | |
| 2011/0184738 A1 | 7/2011 | Kalisky et al. | |
| 2011/0197237 A1 | 8/2011 | Turner | |
| 2011/0222786 A1 | 9/2011 | Carmel et al. | |
| 2011/0225315 A1* | 9/2011 | Wexler | H04L 65/4076 709/231 |
| 2011/0225417 A1 | 9/2011 | Maharajh et al. | |
| 2011/0239078 A1 | 9/2011 | Luby et al. | |
| 2011/0246657 A1 | 10/2011 | Glow | |
| 2011/0246659 A1 | 10/2011 | Bouazizi | |
| 2011/0268178 A1 | 11/2011 | Park et al. | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2011/0314500 A1 | 12/2011 | Gordon et al. | |
| 2012/0005368 A1 | 1/2012 | Knittle et al. | |
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0179834 A1 | 7/2012 | Van Der Schaar et al. | |
| 2012/0201475 A1 | 8/2012 | Carmel et al. | |
| 2012/0201476 A1 | 8/2012 | Carmel et al. | |
| 2012/0254455 A1* | 10/2012 | Adimatyam | H04N 21/44209 709/231 |
| 2012/0278496 A1 | 11/2012 | Hsu | |
| 2012/0307883 A1 | 12/2012 | Graves | |
| 2013/0044821 A1 | 2/2013 | Braness et al. | |
| 2013/0046902 A1 | 2/2013 | Villegas Nuñez et al. | |
| 2013/0061045 A1 | 3/2013 | Kiefer et al. | |
| 2013/0064466 A1 | 3/2013 | Carmel et al. | |
| 2013/0094565 A1 | 4/2013 | Yang et al. | |
| 2013/0152767 A1 | 6/2013 | Katz et al. | |
| 2013/0166765 A1 | 6/2013 | Kaufman | |
| 2013/0166906 A1 | 6/2013 | Swaminathan et al. | |
| 2013/0170764 A1 | 7/2013 | Carmel et al. | |

(56) References Cited

U.S. PATENT DOCUMENTS

| | | |
|---|---|---|
| 2013/0182952 A1 | 7/2013 | Carmel et al. |
| 2014/0101722 A1 | 4/2014 | Moore |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143440 A1 | 5/2014 | Ramamurthy et al. |
| 2014/0177734 A1 | 6/2014 | Carmel et al. |
| 2014/0189065 A1 | 7/2014 | Schaar et al. |
| 2014/0211859 A1 | 7/2014 | Carmel et al. |
| 2014/0269936 A1 | 9/2014 | Shivadas et al. |
| 2014/0355668 A1 | 12/2014 | Shoham et al. |
| 2015/0049957 A1 | 2/2015 | Shoham et al. |
| 2015/0063693 A1 | 3/2015 | Carmel et al. |

FOREIGN PATENT DOCUMENTS

| | | |
|---|---|---|
| EP | 2486727 A1 | 8/2012 |
| EP | 2564354 A1 | 3/2013 |
| EP | 2616991 A2 | 7/2013 |
| EP | 2617192 A2 | 7/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 A4 | 6/2014 |
| EP | 2751990 A1 | 7/2014 |
| EP | 2807821 A2 | 12/2014 |
| EP | 2751990 A4 | 4/2015 |
| WO | 9731445 A3 | 4/1998 |
| WO | 9910836 A1 | 3/1999 |
| WO | 2004102571 A1 | 11/2004 |
| WO | 2006018843 A2 | 2/2006 |
| WO | 2006018843 A3 | 12/2006 |
| WO | 2007113836 A2 | 10/2007 |
| WO | 2007113836 A3 | 11/2008 |
| WO | 2007113836 B1 | 12/2008 |
| WO | 2009065137 A1 | 5/2009 |
| WO | 2010060106 A1 | 5/2010 |
| WO | 2010122447 A1 | 10/2010 |
| WO | 2011042898 A1 | 4/2011 |
| WO | 2011042900 A1 | 4/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 2012094181 A2 | 7/2012 |
| WO | 2012094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013111126 A2 | 8/2013 |
| WO | 2013111126 A3 | 8/2013 |
| WO | 2013144942 A1 | 10/2013 |
| WO | 2015031982 A1 | 3/2015 |

OTHER PUBLICATIONS

European Search Report for Application 11855103.5, search completed Jun. 26, 2014, 9 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20. 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform: Player Framework, "Microsoft Media Platform: Player Framework v2.5 (formerly Silverlight Media Framework)", 2 pages.
The Official Microsoft IIS Site, Smooth Streaming Client, 4 pages.
"Adaptive Streaming Comparison", Jan. 28, 2010, 5 pgs.
"Best Practices for Multi-Device Transcoding", Kaltura Open Source Video, 13 pgs.
"Netflix turns on subtitles for PC, Mac streaming", 3 pgs.
"Thread: SSME (Smooth Streaming Medial Element) config.xml review (Smooth Streaming Client configuration file)", 3 pgs.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/concept ual/streamingmediaguide/UsingHTTPLiveStreaming/UsingHTTPLiveStreaming.html#//apple_ref/doc/uid/TP40008332-CH102-SW1, 10 pgs.
Akhshabi et al., "An Experimental Evaluation of Rate-Adaptation Algorithms in Adaptive Streaming over HTTP", MMSys'11, Feb. 24-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2012, pp. 1-9.
Author Unknown, "Tunneling QuickTime RTSP and RTP over HTTP", Published by Apple Computer, Inc.: 1999 (month unknown), 6 pages.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kim, Kyuheon "MPEG-2 ES/PES/TS/PSI", Kyung-Hee University, Oct. 4, 2010, 66 pages.
Kurzke et al. "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Noé, Alexander "Matroska File Format (under construction !)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

(56) References Cited

OTHER PUBLICATIONS

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Pantos, R "HTTP Live Streaming: draft-pantos-http-live-streaming-06", Published by the Internet Engineering Task Force (IETF), Mar. 31, 2011, 24 pages.

RGB Networks, "Comparing Adaptive HTTP Streaming Technologies", Nov. 2011, Retrieved from: http://btreport.net/wp-content/uploads/2012/02/RGB-Adaptive-Http-Streaming-Comparison-1211-01.pdf, 20 pgs.

Schulzrinne, H et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.

Siglin, "HTTP Streaming: What You Need to Know", streamingmedia.com, 2010, 15 pages.

Siglin, "Unifying Global Video Strategies, MP4 File Fragmentation for Broadcast, Mobile and Web Delivery", Nov. 16, 2011, 16 pgs.

Wu, Feng et al., "Next Generation Mobile Multimedia Communications: Media Codec and Media Transport Perspectives", In China Communications, Oct. 2006, pp. 30-44.

Zambelli, Alex, "IIS Smooth Streaming Technical Overview", Microsoft Corporation, Mar. 2009.

\* cited by examiner

USE OF OBJECTIVE QUALITY MEASURES OF STREAMED CONTENT TO REDUCE STREAMING BANDWIDTH

BACKGROUND

Distribution of multimedia (also referred to herein as "media" and/or "program(s)"), such as movies and the like, from network services to a client device may be achieved through adaptive bitrate streaming of the media. Typically, the media may be encoded at different bitrates and resolutions into multiple bitrate streams that are stored in the network services. Conventional adaptive bitrate streaming of media includes determining streaming conditions, e.g., an available streaming bandwidth at the client device, and then streaming a selected one of the different bitrate streams from the network services to the client device based on the determined conditions.

From the perspective of the network service, streaming media includes transmitting the media in response to requests from the client device. From the perspective of the client device, streaming media includes continuously requesting and receiving the media from the network services, and storing the received media in a buffer for subsequent presentation or playback, essentially, in near real-time. The buffered media may be presented, i.e., played back, in audio-visual form, for example.

The human visual system perceives a perceptual or subjective quality of streamed, presented media, and is able to detect small changes in the perceptual quality. The perceptual quality generally increases and decreases as the encoded bitrate of the streamed program (i.e., "streaming bitrate") increases and decreases. Therefore, more or less available streaming bandwidth may translate to more or less perceptual quality, respectively.

Given the ever pressing need to conserve bandwidth at the client device, conventional streaming techniques tend to select a streaming bitrate deemed to be sufficiently high to meet an acceptable level of perceptual quality, based on the streaming bandwidth conditions determined at the client device, as mentioned above. This bandwidth-centric determination and selection at the client device does not take into consideration changes or variations in the content contained in the media itself over time as the media is streamed and, therefore, often results in unnecessarily high, and therefore, bandwidth-wasteful, streaming bitrates.

BRIEF DESCRIPTION OF THE DRAWINGS/FIGURES

Figure 1:
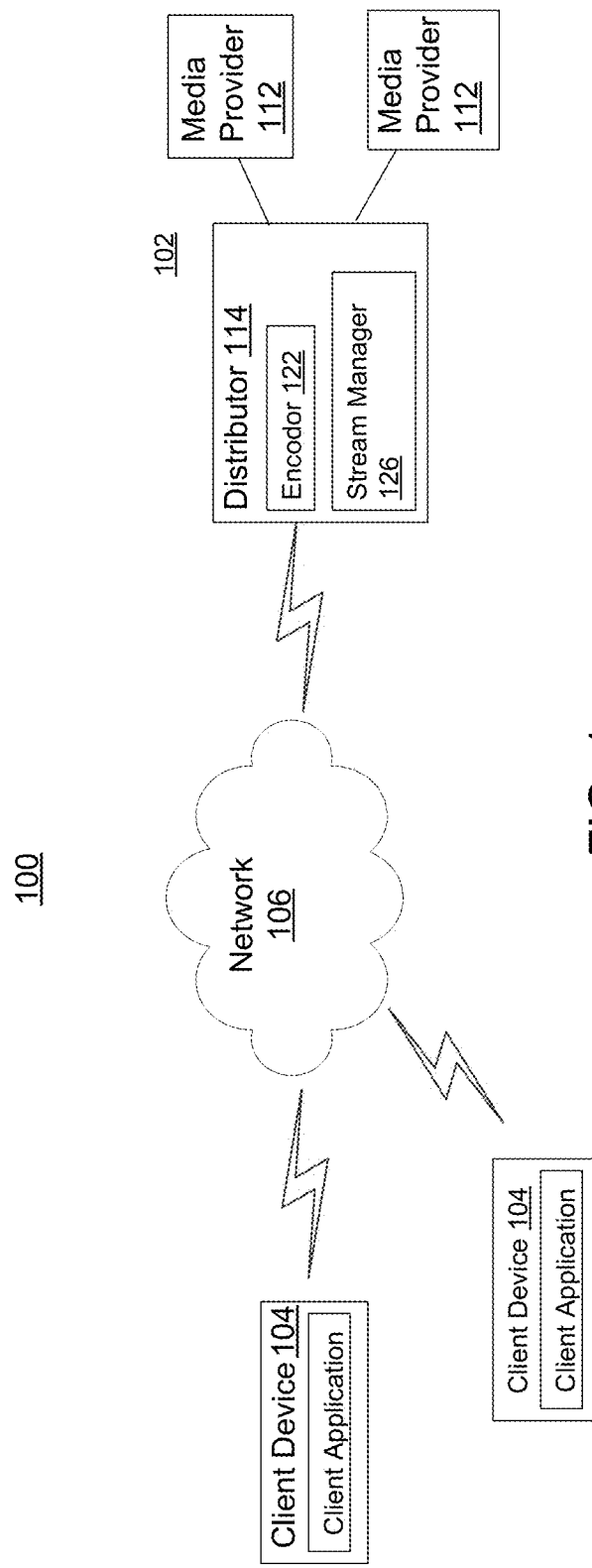
FIG. 1 is a block diagram of an example network environment in which adaptive streaming of multimedia (also referred to herein as "media" and "program(s)") from network services to a client device may be implemented.

In the drawings, the leftmost digit(s) of a reference number identifies the drawing in which the reference number first appears.

DETAILED DESCRIPTION

Embodiments described herein are directed to adaptive streaming of a video program from network services to a client device that utilize encoded video section swapping to reduce streaming bandwidth, while minimally impacting a perceptual/presentation quality of the streamed program at the client device. The adaptive streaming with section swapping embodiments reduce streaming bandwidth at client the device based on characteristics or properties of content in the video program, i.e., measures of objective quality indicative of perceptual quality, that change over time while the program is being streamed. More specifically, the embodiments determine swappable, corresponding/co-located sections of video encoded at different bitrates based on the measured objective quality levels of the co-located sections and the predetermined criterion of objective quality. The swappable, co-located sections include a section encoded at a first bitrate and a section encoded at a second bitrate that is less than the first bitrate. During streaming of the video program, the section encoded at the first bitrate is replaced with the co-located section encoded at the lesser second bitrate, thereby conserving streaming bandwidth by a substantial amount approximately equally to a difference between the first and second bitrates.

Network Environment

FIG. 1 is a block diagram of an example network environment 100 in which adaptive streaming of programs from network services to a client device may be implemented. Network environment 100 includes a collection of server-side services 102 that interact and cooperate to originate, manage, and distribute, e.g., stream, programs to a user operated client device 104 over one or more networks 106, such as the Internet. Such programs include, but are not limited to, entertainment programs (e.g., television shows, movies, cartoons, news programs, etc.), educational programs (e.g., classroom video, adult education video, learning programs, etc.), and advertising programs (e.g., commercials, infomercials, or marketing content). Network services 102 communicate with each other and with client device 104 using any suitable communication protocol, such as an Internet protocol, which may include Transmission Control Protocol/Internet Protocol (TCP/IP), Hypertext Transfer Protocol (HTTP), etc.

Client device 104 may be capable of wireless and/or wired communication with networks 106. Client device 104 includes processing, storage, communication, and user interface capabilities sufficient to provide all of the client device functionality described herein. Such functionality may be provided, at least in part, by one or more applications, such as computer programs, that execute on client device 104. Applications executed on client device 104 may include a client-side application, which presents Graphical User Interfaces (GUIs) through which a user of the client device may interact with and request services from corresponding server-side applications hosted in services 102. Accordingly, under user control, client device 104 may request/select programs from services 102, stream the selected programs from the services, and then present the streamed programs, in other words, playback the streamed programs.

Network services 102 include, but are not limited to, one or more media provider(s) 112 to originate source programs, and one or more media distributor(s) 114 to encode, store, and distribute the programs to client device 104. Each of the services 102 may be implemented as one or more computer servers that execute one or more associated server-side computer program applications suited to the given service. Media providers 112, such as Netflix®, HBO®, cable networks, and so on, utilize network services 102 to manage and deliver their revenue bearing programs to client device 104. Media providers 112 download their source programs to distributor 114, which encodes, stores, and then streams the encoded programs to client device 104 when requested to do so.

Distributor 114 includes an encoder 122 and a stream manager 126. Encoder 122 may encode each program into a number of alternative streams to support adaptive bitrate streaming of the program. The alternative streams encode the same program in different ways, such as at one or more of different bitrates, one or more different resolutions, and/or one of more different frame rates. As will be described more fully below in connection with FIG. 2, each of the encoded streams is typically stored in one or more container files. Encoder 122 also generates a program index file for the container files associated with the encoded program. Stream manager 126 manages streaming of the encoded program from the container files to client device 104 when the client device requests the program. Stream manager 126 cooperates with the requesting client device 104 to support adaptive bitrate streaming of the program from the container files to the client device.

Distributor 114 may also store auxiliary streams which contain information associated with the program streams mentioned above. The auxiliary streams are encoded at low bitrates, e.g., at bitrates of 200 kbps or much less. The auxiliary streams may include metadata synchronized in time with and descriptive of the content in associated main program streams. The metadata may include cues indicating or bracketing, e.g., commercial segments, or other non-program segments/content, such as level-drop information for encoded section swapping as will be described below, interspersed throughout the program streams. Typically, such auxiliary streams would be streamed simultaneously with their associated program streams and handled appropriately at the client device. However, the auxiliary streams may be streamed before the program streams.

As discussed above, client-side GUIs provide a user with access to services and program offerings. Such client-side GUIs typically include easily navigable program guides, and may present programs and channel selection options, program descriptions, advertisements, programming/user control options, and other typical programming features, as would be appreciated by those of ordinary skill in the relevant arts. The client-side GUIs accept user selections/requests, such as a request to view a program. In response to such GUI selections/requests, the client-side application sends appropriate requests to a counterpart server-side application residing in distributor 114, to initiate the appropriate actions among services 102 that will satisfy the client selections/requests, e.g., enable a client device to stream the selected program from the distributor for presentation to the user.

Container Files—Streaming Sources

As described above, distributor 114 encodes source programs from providers 112. To support adaptive bitrate streaming, distributor 122 may encode the source programs at multiple bitrates to produce multiple streams for each source program, as will be described more fully below in connection with FIG. 2. While streaming such encoded programs, client device 104 may switch between streams (and thus between encoded bitrates and corresponding streaming rates) according to conditions at the client device.

Figure 2:
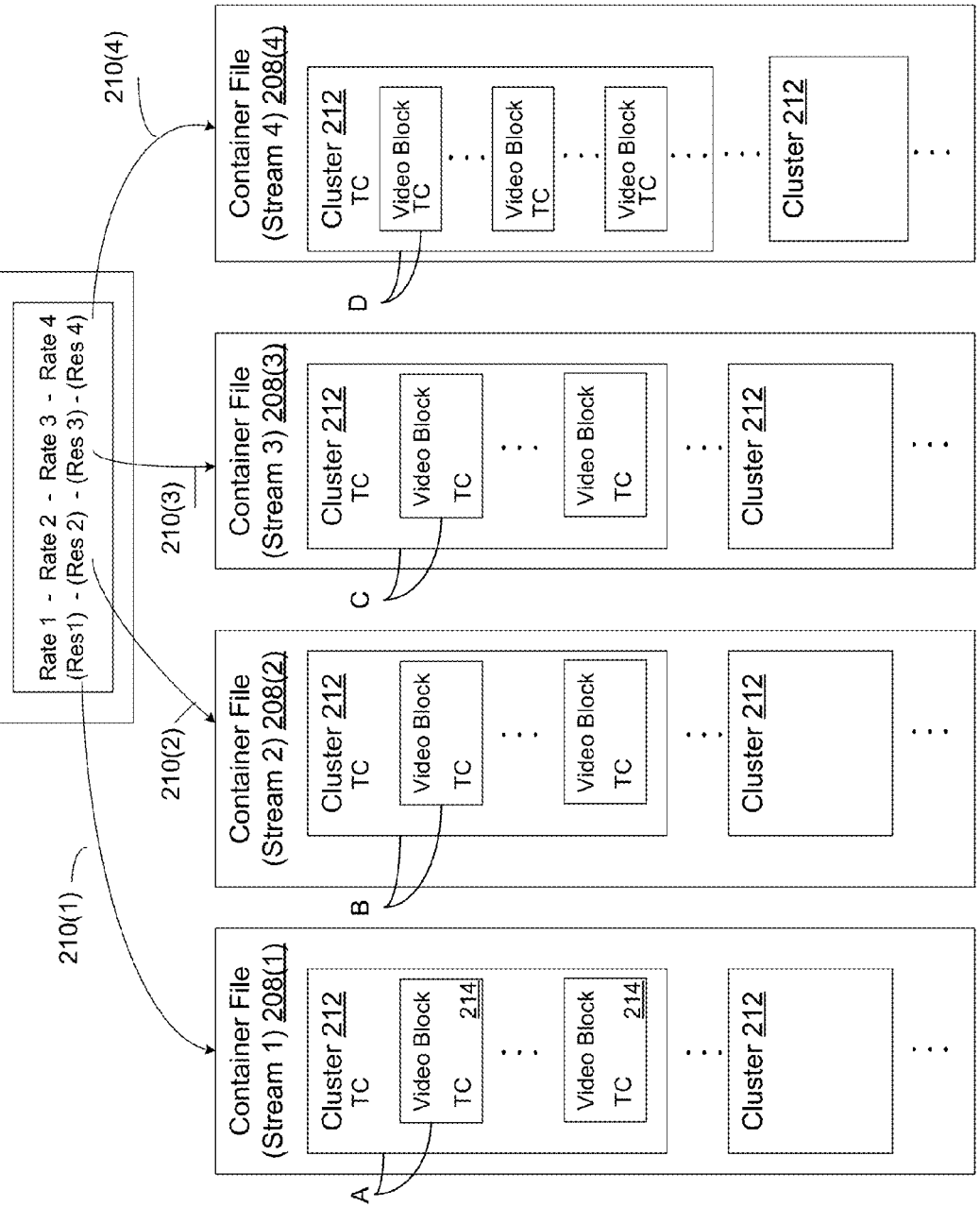
FIG. 2 is an illustration of an example encoded video program generated by a media distributor.

FIG. 2 is an illustration of an example encoded video program 200 generated by distributor 112. Encoded video program 200 includes multiple (encoded) video streams 1-4 encoded at multiple corresponding bitrates Rate 1-Rate 4. Encoded video streams 1-4 encode video at multiple video resolutions Res 1-Res 4, which may be equal to or different from each other. Encoded video program 200 includes a program stream index 204 and multiple container files 208(1)-208(4) corresponding to streams 1-4.

Program stream index 204 includes pointers 210(1)-(4), e.g., Uniform Resource Locators (URLs), to corresponding container files 208(1)-(4), and lists encoding parameters used to encode each of the streams 1-4, including, but not limited to, encoded bitrates Rate 1-Rate 4, encoding resolutions Res 1-Res 4, frame rates, and encoding techniques/standards. Exemplary, non-limiting, bitrates may range from below 125 kilo-bits-per-second (kbps) up to 15,000 kbps, or even higher, depending on the type of encoded media.

Each of container files 208 comprises sequential clusters 212 of a larger media sector (not shown in FIG. 2), and sequential blocks 214 of encoded media (which may also include audio, text, multimedia, etc., in addition to video) within each of the clusters. Each cluster 212, and each block 214, includes a time code TC indicating a start time for the media encoded in the blocks of that cluster, and encodes a fixed duration of media. For example, each cluster 212 of container file 208(1) encodes two seconds of video. In other embodiments, each cluster may encode a different duration of media, which may vary from two seconds. Each cluster 212 is a self-contained unit of media that may be decoded and presented on client devices 204 without reference to any other clusters. Clusters 212 may also include successive cluster numbers identifying a streaming sequence of the clusters.

Each cluster/block 212/214 in a given one of container files 208 encodes the same content (e.g., video content) as corresponding clusters in the other ones of the container files. For example, the cluster/block indicated at A in container file 208(1) has encoded therein the same video as that encoded in the clusters/blocks indicated at B, C, and D of container files 208(2), 208(3), and 208(4), respectively. Corresponding clusters/blocks are also referred to herein as "co-located" clusters/blocks because they encode the same video and share the same time code TC, i.e., they are aligned or coincide in time.

Figure 3:
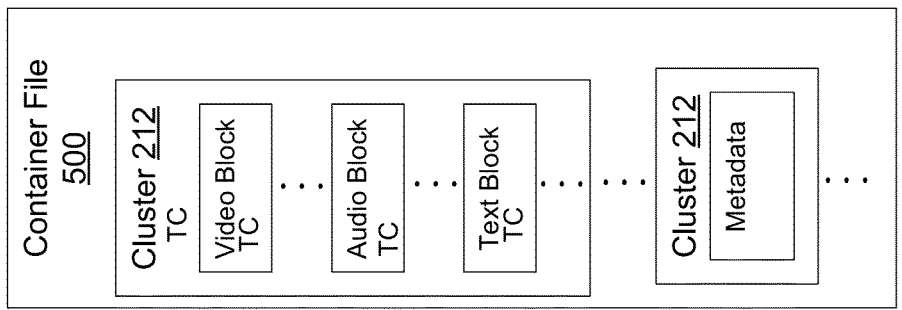
FIG. 3 is an illustration of a container file that encodes a single audio stream.
Figure 4:
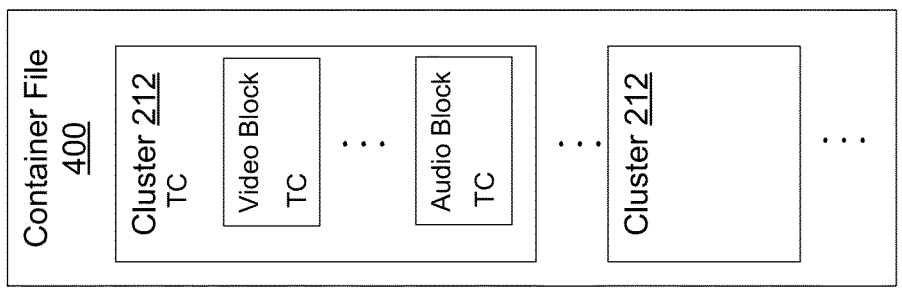
FIG. 4 is an illustration of a container file that encodes multiplexed audio and video streams.
Figure 5:
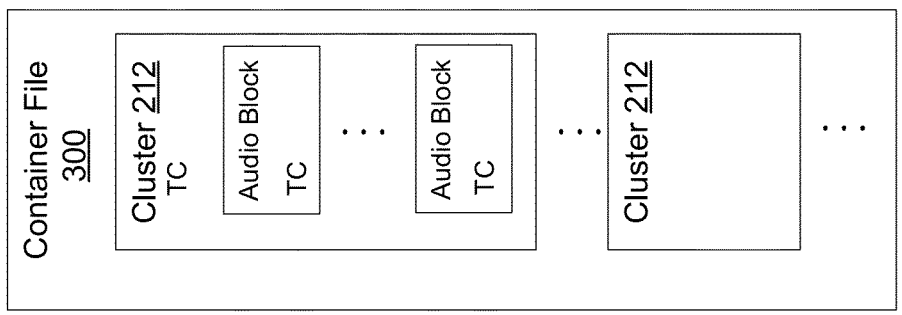
FIG. 5 is an illustration of a container file that encodes multiplexed video, audio, text, and metadata streams.

Container files may encode a single stream, such as a video stream (as depicted in FIG. 2), an audio stream, or a text stream (e.g., subtitles). Alternatively, each container file may encode multiple multiplexed streams, such as a mix of video, audio, and text streams. FIGS. 3-5 are further illustrations of diverse container files.

FIG. 3 is an illustration of a container file 300 that encodes a single audio stream.

FIG. 4 is an illustration of a container file 400 that encodes multiplexed audio and video streams.

FIG. 5 is an illustration of a container file 500 that encodes multiplexed video, audio, text, and metadata streams.

In addition, a container file may encode only a metadata stream at a relatively low bitrate.

The encoded container files depicted in FIGS. 2-5 support adaptive streaming to client device 104. If conditions change while streaming, then client device 104 may switch between container files to stream at rates best suited to the conditions.

In embodiments: the container files may be Matroska containers based on Extensible Binary Meta Language (EBML), which is a derivative of Extensible Binary Meta Language (XML), or files encoded in accordance with the Moving Picture Experts Group (MPEG) standard; the program index may be provided in a Synchronized Multimedia Integration Language (SMIL) format; and client device 104 may implement adaptive streaming from distributor 114 over networks 106 using the HTTP protocol.

The container files described above may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

Section Swapping: Objective Quality Vs. Perceptual Quality

Adaptive streaming embodiments described herein take into consideration certain characteristics in the content in video programs (also referred to herein simply as "video") to be streamed, to reduce streaming bitrates, as will now be described. The human visual system is able to detect small changes in the perceptual or presentation quality of presented video. However, perceptual quality and changes in perceptual quality are difficult to measure directly. Instead, certain characteristics or properties of encoded video, that are indicative of perceptual quality video as actually presented (i.e., once the encoded video is decoded and presented), may be determined, e.g., measured directly, in a straight forward manner. Such measured properties represent an objective quality of the video. As the content of encoded video varies across successive sections of the encoded video, and between co-located sections of encoded video in different video streams, the objective quality correspondingly varies, and may be measured to determine a level of objective quality corresponding to each of the aforementioned sections. The term "section" as used herein refers to a number of successive frames of video, including, but not limited to, multimedia audio-visual content, which may be collected into successive blocks and clusters in container files for streaming, as described above.

The difference in objective quality levels between co-located sections of encoded video (e.g., between co-located clusters from two container files that encode the same video but at different bitrates) may be used to determine a corresponding difference in the perceptual quality of the two video sections. Specifically, the difference in objective quality levels may be used to determine whether that difference is sufficiently large as to cause a visually noticeable difference in the perceptual quality of the two sections (once decoded and presented). With this in mind, there exists a criterion of objective quality (referred to as a predetermined "swap criterion" of objective quality), for the two objective quality levels, that translates to a virtually imperceptible difference in perceptual quality. Two co-located sections having objective quality levels that meet this criterion are considered interchangeable or swappable with each other for purposes of streaming to a client device because of their imperceptible or nearly imperceptible difference in perceptual quality. "Co-located" sections are also referred to herein as "corresponding" sections.

Swappable, co-located, encoded sections may be swapped to reduce streaming bandwidth in cases where co-located sections include a first section encoded at a relatively high bitrate and a (co-located) second section encoded at a relatively low bitrate. Specifically, streaming the (lower bitrate) second section instead of (i.e., in place of) its co-located (higher bitrate) first section reduces streaming bandwidth, while maintaining perceptual quality. The first section is referred to herein as a "replaceable section" and the second section that is streamed instead of the first section is referred to herein as the "replacement section." The more often high bitrate sections are replaced with their co-located low bitrate sections while streaming, i.e., the more often bitrate swapping occurs, the more streaming bandwidth is conserved.

Measures of objective quality of a section of encoded video (e.g., of a cluster/block of encoded video) include, but are not limited to, a signal-to-noise ratio (SNR) of the section, a peak SNR (PSNR) of the section, a structural similarity index (SSIM) that measures a similarity between sections, and so on.

PSNR is a commonly used measure for assessing a quality of reconstructed video after compression (encoding). PSNR is measured on a logarithmic scale and depends on the Mean Squared Error (MSE) between an original source image and an impaired image or video frame. A higher PSNR generally indicates better quality, while a lower PSNR generally indicates poorer quality. Formulas for PSNR are given below:

$$MSE = \frac{1}{mn}\sum_{i=0}^{m-1}\sum_{j=0}^{n-1}[I(i, j) - K(i, j)]^2$$

$$PSNR = 10 \cdot \log_{10}(MAX_i^2 / MSE)$$

Where: m & n are dimensions of an image; I & K are components of an image (Y, U, V); and $MAX_i$ is a maximum possible pixel value.

Each section of encoded video may be assigned one or more scores based on the different possible objective quality measures. Multiple successive encoded sections may have their objective quality levels combined into and, therefore, associated with, a single measurement of objective quality, which may include, e.g., a mean or variance of the SNR (or PSNR) of each of the multiple sections.

A criterion of objective quality that indicates co-located sections may be swapped with little or no impact on perceptual quality—if the co-located section have levels of objective quality that each meet that criterion—may be based on one of:
a. an absolute level of objective quality, e.g., co-located clusters are declared swappable if the PSNR of each cluster is above a threshold PSNR; and
b. a difference between respective levels objective quality of co-located encoded sections, e.g., co-located clusters are declared swappable if a difference between their respective PSNR values is less than a certain PSNR difference threshold.

For relative criterion (b), a variable scale may be defined using as a base PSNR a highest level PSNR among encoded sections under consideration; e.g., for encoded section PSNR levels in a range of 29 dB and 31 dB, an acceptable difference value may be 1.5 dB, and for encoded section PSNR levels in a range of 27 dB and 29 dB, an acceptable PSNR difference level may be only 1 dB. The variable scale may be extended to cover all encoded section PSNR levels that are expected as part of an encoding process, and may also extend to cover other objective quality metrics such as a mean, a variance, a difference between highest and lowest PSNR levels in a cluster, or a formula combining some or all of these or other metrics. Such assignments may be altered based on the type of objective quality that is used.

Embodiments directed to adaptive streaming using section swapping described below include (i) a "swapping-while-streaming" embodiment in which swappable co-located sections from different files are swapped while streaming, and (ii) a "pre-swapped streaming" embodiment in which a single file containing pre-swapped sections is constructed from multiple encoded files before streaming is initiated, and then all of the sections in the single file, including the pre-swapped sections, are streamed from that file. Examples of these embodiments are described below.

Swapping-While-Streaming

In swapping-while-streaming, swappable co-located sections are swapped while streaming from multiple different container files in real-time, such as from multiple container files 208 in FIG. 2.

Figure 6:
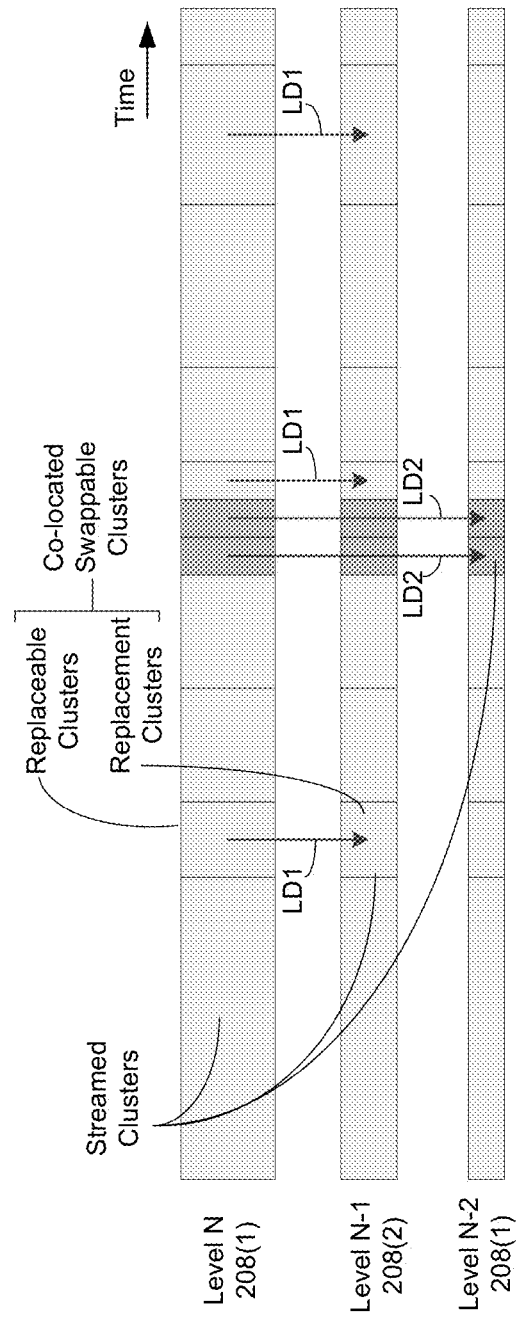
FIG. 6 is an illustration of an example of swapping-while-streaming from the container files of FIG. 2.

FIG. 6 is an illustration of an example of swapping-while-streaming from container files 208 of FIG. 2. With reference to FIG. 6, the example assumes the following:
a. Separate container files 208(1), 208(2), and 208(3) represent three levels N, N−1, and N−2, respectively, of the n levels available for, e.g., DivX® Plus Streaming;
b. Levels N, N−1, and N−2 are each encoded at successively decreasing bitrates but may be at the same resolution. In other examples, the Levels are each encoded at successively decreasing bitrates but may be at different resolutions;
c. Swappable, co-located clusters (including a replaceable section and its corresponding replacement section) have been determined and identified across the container files 208(1)-208(3). As described above, the swappable, co-located clusters are determined based on determined/measured objective quality levels of the clusters in the container files and a comparison of the determined/measured objective quality levels (of co-located sections) against a predetermined criterion of objective quality indicative of a minimal difference in perceptual quality; and
d. Level N is initially selected for streaming.

Traversing left-to-right in FIG. 6, initially, encoded sections from level N are streamed from container file 208(1). Encoded sections are streamed predominantly from level N. However, while the sections from Level N are streamed, replaceable (swappable) sections thereof are encountered and replaced with co-located replacement (swappable) sections from level N−1, or level N−2, as indicated at LD1, or LD2, respectively. That is, the lower level, co-located replacement sections are streamed instead of the higher level replaceable sections, resulting in conserved streaming bandwidth. Each replacement section is streamed at the same time its corresponding co-located replaceable section would have been streamed had it not been replaced, so as to maintain a proper encoded video sequence. A section swap is referred to as a "level-drop" because the source level (n) from which the replacement section is streamed is lower than the current level, e.g., in a swap, the level drops from Level N to Level N−1, or Level N−2. In swapping-while-streaming, client device 104 and distributor 114 cooperate with each other to swap sections from different container files.

Pre-Swapped Streaming

In pre-swapped streaming, a single file containing swappable sections, i.e., level-drops, is constructed from multiple files before streaming. Then, the sections in the single file, including the pre-swapped sections, are streamed from that file.

Figure 7:
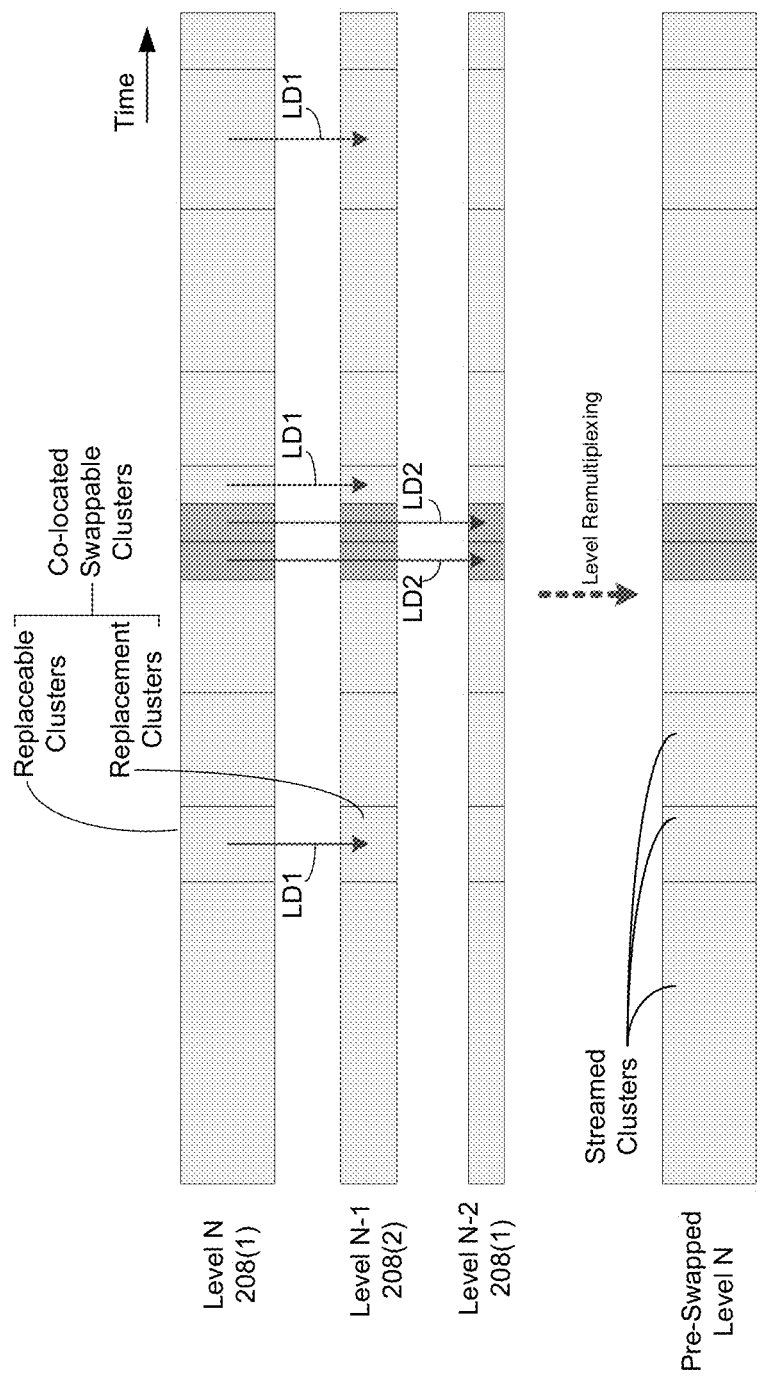
FIG. 7 is an illustration of an example of pre-swapped streaming using the container files of FIG. 2.

FIG. 7 is an illustration of an example of pre-swapped streaming using container files 208 of FIG. 2. Before streaming, swappable, co-located clusters are determined and identified across levels N, N−1, and N−2, similar to the swapping-while-streaming embodiment. The determined swaps, or level-drops, are incorporated into Level N. In other words, determined and identified replaceable sections of Level N are replaced with co-located replacement sections of Levels N−1 and N−2, as identified. As a result, a new, pre-swapped Level N file is constructed that incorporates original sections of Level N that were not indicated as replaceable, and the determined/identified replacement sections (i.e., level-drops) instead of the replaceable sections. Then, sections are streamed only from the new, pre-swapped Level N file. In pre-swapped streaming, streaming of the pre-swapped sections is transparent to client device 104, which simply requests streaming sections from the single file. The examples of FIGS. 6 and 7 may be extended over more container files at different bitrates, and thus more levels and corresponding level-drops.

Level-Drop Information

Figure 8:
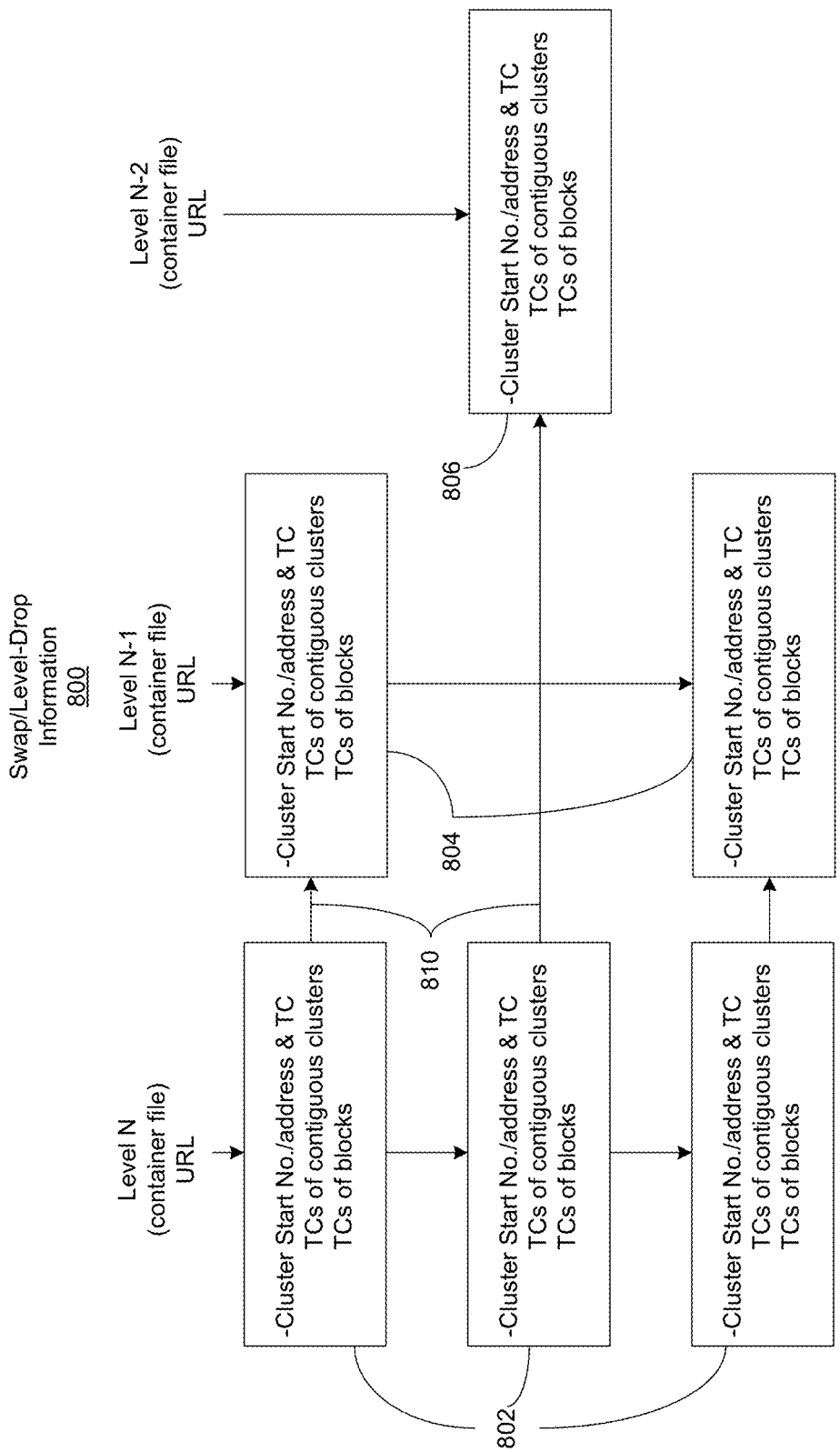
FIG. 8 is an illustration of example level-drop (or swap) information that identifies swappable, co-located clusters, as determined in cluster swapping examples of FIGS. 6 and 7.

FIG. 8 is an illustration of example level-drop (or swap) information 800 that identifies swappable, co-located clusters, as determined in the cluster swapping examples of FIGS. 6 and 7. In the manner described above, and further below, distributor 114 measures objective quality levels of sections, e.g., clusters in container files 208, and then determines swappable co-located clusters between the files based on the measured objective quality levels and a predetermined swap criterion. Distributor 114 generates level-drop information 800 as records 802, 804, and 806 that identify the determined, swappable, co-located clusters in the different files. Each record identifies swappable clusters including a starting cluster and its contiguous following clusters (if any), and also blocks within clusters. Each record may include one or more of cluster/block numbers, time codes TC, locations/addresses of the clusters in the file. Level-drop information 800 includes:

a. records 802 linked vertically to indicate determined, time-ordered, replaceable clusters among the clusters of level N, e.g., in container file 208(1);
b. records 804 linked vertically to indicate determined, time-ordered replacement clusters among the clusters of level N−1, e.g., in container file 208(2); and
c. records 806 to indicate a determined replacement cluster among the clusters of level N−2, e.g., in container file 208(3).

Horizontal links 810 between records indicating co-located, replaceable and replacement clusters, e.g. between Level N and Levels N−1, N−2.

Distributor 114 may embed level-drop information 800 as in container files as metadata. Alternatively, or additionally, level-drop information may be stored as an auxiliary/metadata, level-drop file that is stored and indexed separately from the container files. Therefore, in the swapping-while-streaming embodiment, level-drop information 800 may be streamed from distributor 114, to client device 104, with streamed clusters. Alternatively, level-drop information may be streamed from the auxiliary file separately from the clusters.

In the pre-swapped embodiment, distributor 114 uses level-drop information 800 to construct a single pre-swapped file and need not be streamed to client device 104. However, client device 104 does not need the level-drop information.

Server-Client Sequence Diagram

Figure 9:
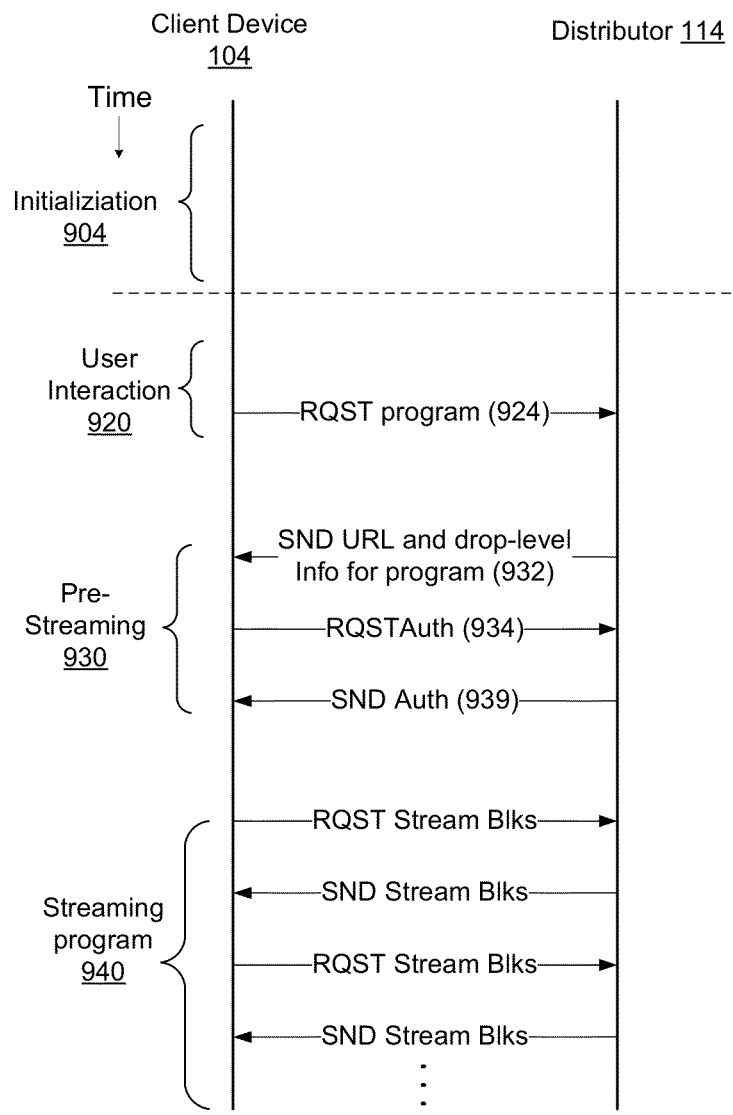
FIG. 9 is a sequence diagram of example high-level interactions between a distributor and a client device in the network environment of FIG. 1.

FIG. 9 is a sequence diagram of example high-level interactions 900 between distributor 114 and client device 104 in network environment 100. Interactions 900 progress in time from top-to-bottom in FIG. 9, as a sequence of phases beginning with an initialization/set-up phase 904 indicated in the top left-hand corner of FIG. 9.

During initialization/set-up phase 904, distributor 114 encodes video programs and stores the encoded video programs in container files for subsequent streaming to client device 104. Distributor 114 determines swappable co-located sections among the container files associated with each program based on determined objective quality measures and a predetermined swap criterion for the objective quality measures of co-located clusters in different files, as discussed above. Distributor 114 embeds drop-level information, such as information 900, in the container files, or stores the information in a separate drop-level file. In the pre-swapped embodiment, distributor 114 constructs a single file for streaming using the drop-level information and the multiple container files.

During a user interaction phase 920, client device 104 presents client-side GUIs to a user. At 924, the user selects a program from the GUIs, and, in response, client device 104 sends a request for the program to distributor 114.

During a pre-streaming phase 930, in response to the client device request (at 924), at 932, the distributor 114 sends an index of URLs associated with the requested program to client device 104. In the swapping-while-streaming embodiment, distributor 114 may also sends drop-level information if such information is provided in a separate file. Alternatively, distributor 114 may stream the drop-level information to client 104 in subsequent pre-streaming and streaming phases 930, 940, described below. The URLs may include a first URL directed to a program index (e.g., index 204 in FIG. 2) for the encoded program corresponding to the requested program and stored in distributor 114, and a second URL directed to a drop-level file, if available.

During streaming phase 940, streaming of the requested program from distributor 114 to client device 104 commences. Client device 104 determines a streaming bandwidth available at the client device and selects a stream from among the multi-bitrate streams, as indicated in the program index, that best matches the determined bandwidth. Client device 104 continually requests encoded stream sections from container files in distributor 114 based on the index information and the level-drop information (in the swapping-while-streaming embodiment), and receives the requested blocks from the distributor. In the swapping-while-streaming embodiment, the level-drop information may have been received during pre-streaming phase 930, may be streamed from a separate level-drop file, and/or may be embedded as records in the encoded video sections streamed during stage 940. Client device 104 buffers the received sections, decodes the buffered sections, and then presents the decoded sections. As streaming conditions change, client device 104 may switch to a new stream, i.e., request sections from another stream having a bitrate better suited to the changed conditions.

In yet another embodiment, level-drop information may be calculated dynamically at client device 104 instead of distributor 114 based on objective quality levels embedded in streamed sections. In this embodiment, distributor 114 embeds measured objective quality levels in corresponding encoded video sections, and streams the sections to the client device 104. Client device 104 calculates level-drop information based on the received objective quality levels, and performs swapping-while-streaming based on the dynamically calculated objective quality levels.

In both the swapping-while-streaming and pre-swapped embodiments, client device 104 intermittently requests replacement blocks having a lower encoded bitrate than the co-located replaceable block, which advantageously conserves streaming bandwidth at the client device. Each replacement block is streamed at the same its corresponding or co-located replaceable block would have been streamed had it not been replaced.

Client-Side Method

Figure 10:
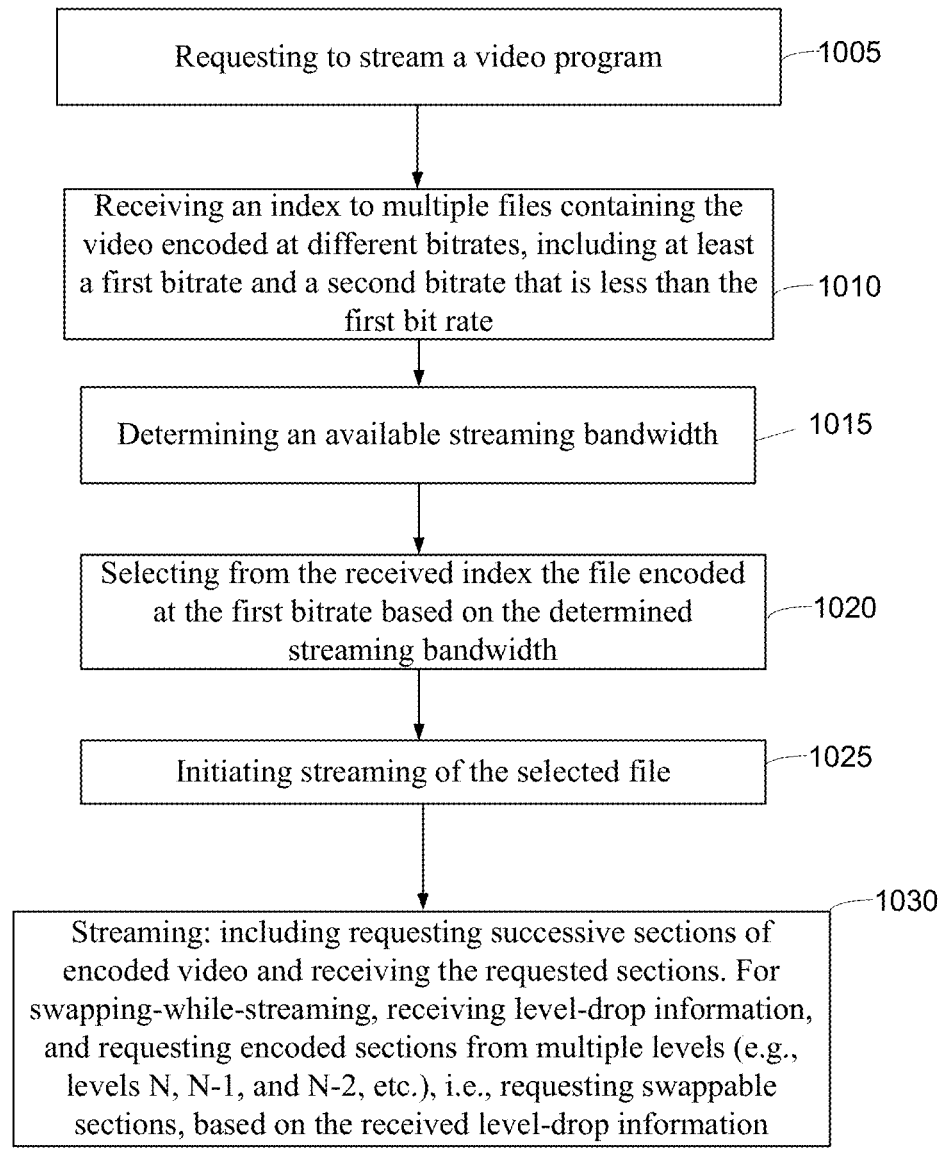
FIG. 10 is a flowchart of an example method of streaming a program, which may be performed at a client device of FIG. 1.

FIG. 10 is a flowchart of an example summary method 1000 of streaming a video program with swapped sections, which may be performed at client device 104.

1005 includes requesting to stream the video program.

1010 includes receiving an index to multiple files containing the video encoded at different bitrates, including at least a first bitrate and a second bitrate that is less than the first bit rate.

1015 includes determining an available streaming bandwidth.

1020 includes selecting from the received index the file encoded at the first bitrate based on the determined streaming bandwidth.

1025 includes initiating streaming of the selected file.

1030 includes streaming the selected file, including requesting successive sections of encoded video and receiving the requested sections. The swapping-while-streaming embodiment also includes receiving level-drop information in any number of ways, including streaming the level-drop information from an auxiliary file before or while streaming the encoded video, or as metadata embedded with the streamed encoded sections. The streaming in the swapping-while-streaming embodiment includes requesting encoded sections from multiple levels (e.g., levels N, N−1, and N−2, etc.), i.e., requesting swappable sections, based on the level-drop information, so as to conserve bandwidth.

Server/Network-Side Method

Figure 11:
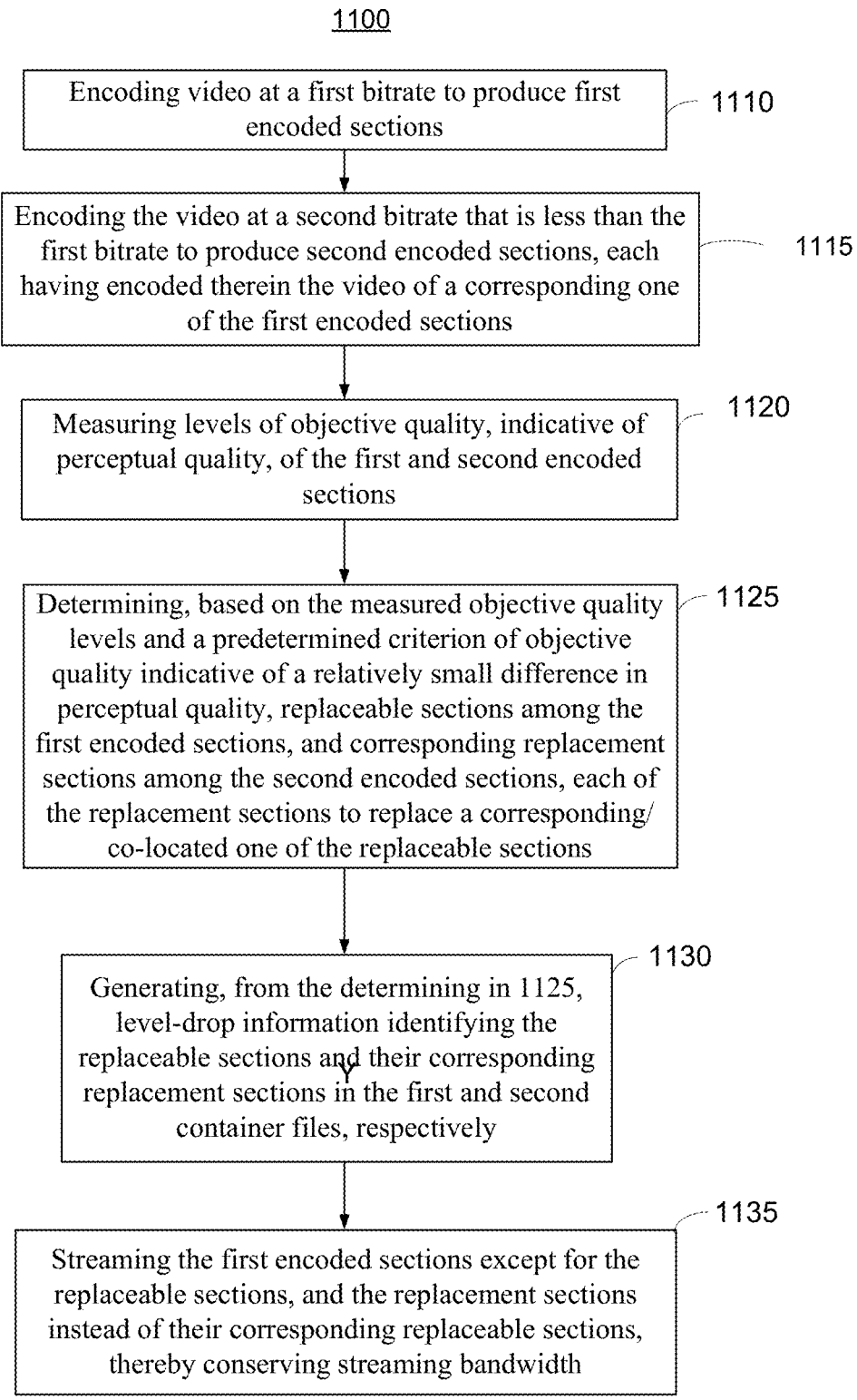
FIG. 11 is a flowchart of an example method of adaptive streaming of programs from network services to a client device, which may be performed in a distributor of the network services.

FIG. 11 is a flowchart of an example summary method 1100 of preparing, and adaptive streaming of, a video program with swapped sections from services 102 to client device 104, which may be performed in distributor 114.

1110 includes encoding video at a first bitrate to produce first encoded sections.

1115 includes encoding the video at a second bitrate that is less than the first bitrate to produce second encoded sections, each having encoded therein the video of a corresponding one of the first encoded sections. The first and second encoded sections may encode video that has the same resolution for each of the first and second encoded sections, or may encode video having different resolutions.

1120 includes measuring levels of objective quality, indicative of perceptual quality, of the first and second encoded sections.

1125 includes determining, based on the measured objective quality levels and a predetermined criterion of objective quality indicative of a relatively small difference in perceptual quality, swappable sections, including replaceable sections among the first encoded sections, and corresponding replacement sections among the second encoded sections, each of the replacement sections to replace a corresponding/co-located one of the replaceable sections. This can be thought of as declaring or identifying certain co-located sections as swappable sections if they meet the predetermined criterion. A result of the determining in 1125 is to identify sections in lower levels (e.g., N-1, N-2) which may be swapped with higher levels (e.g., N) with little or no impact to the subjective/perceptual quality of the video.

1130 includes generating, from the determining in 1125, level-drop information identifying the replaceable sections and their corresponding replacement sections in the first and second container files, respectively.

1135 includes streaming the first encoded sections except for the replaceable sections, and the replacement sections instead of their corresponding replaceable sections, thereby conserving streaming bandwidth. Each replacement section is streamed at the same time its corresponding or co-located replaceable section would have been streamed had it not been replaced.

Figure 12:
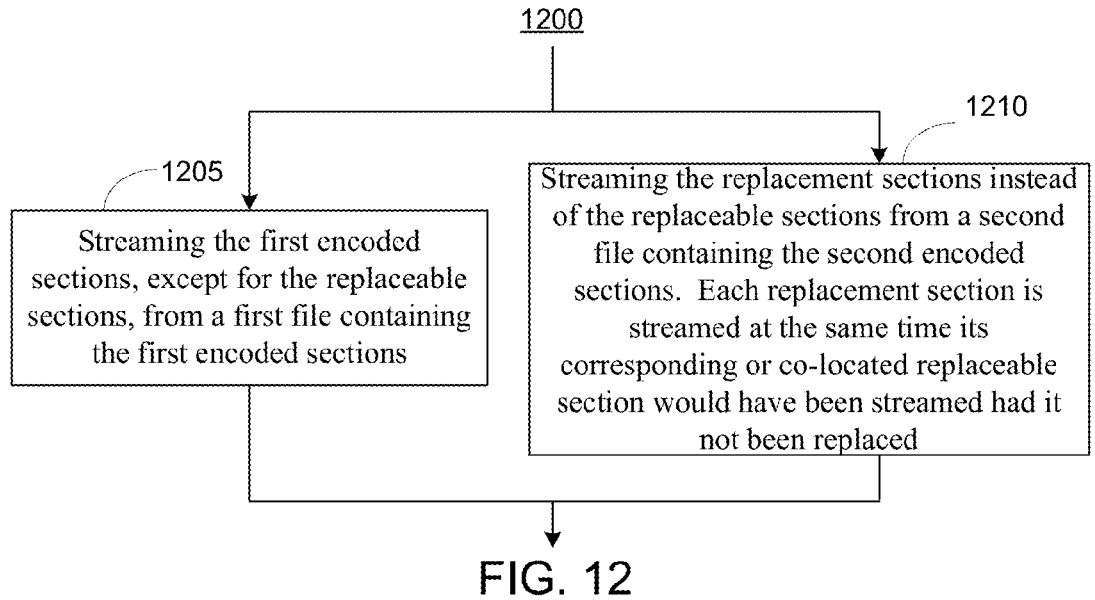
FIG. 12 is a flowchart of a method expanding on the streaming in the method of FIG. 11, corresponding to a swapping-while-streaming embodiment, in which streaming is from multiple files.

FIG. 12 is a flowchart of a method 1200 expanding on the streaming at 1140, corresponding to the swapping-while-streaming embodiment described above, in which streaming is from multiple files.

1205 includes streaming the replacement sections instead of the replaceable sections from a second file containing the second encoded sections. Each replacement section is streamed from the second file at the same time its corresponding replaceable section would have been streamed from the first file.

1210 includes streaming the replacement sections from a second file containing the second encoded sections.

Figure 13:
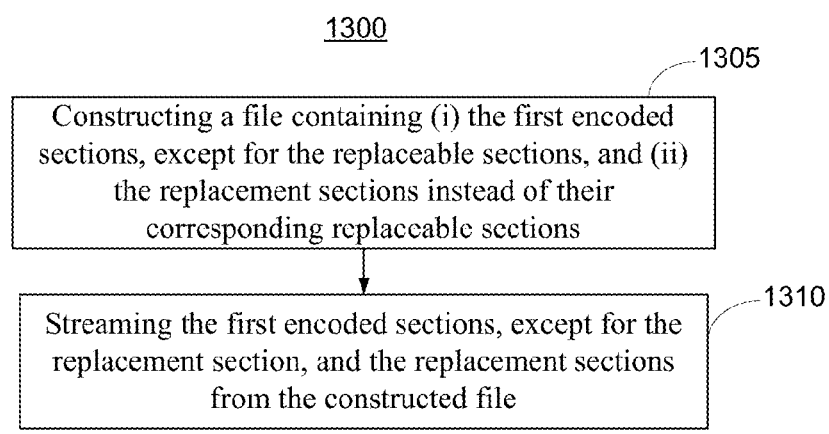
FIG. 13 is a flowchart of a method expanding on the streaming of the method of FIG. 11, corresponding to a pre-swapped embodiment, in which streaming is from a single file constructed from multiple different files.

FIG. 13 is a flowchart of a method 1300 expanding on the streaming at 1140, corresponding to the pre-swapped embodiment described above, in which streaming is from a single file constructed from multiple different bitrate files.

1305 includes constructing a file containing (i) the first encoded sections, except for the replaceable sections, and (ii) the replacement sections instead of their corresponding replaceable sections.

1310 includes streaming the first encoded sections, except for the replacement section, and the replacement sections from the constructed file.

Methods and systems disclosed herein may be implemented with respect to one or more of a variety of systems including one or more consumer systems, such as described below with reference to FIGS. 13 and 14. Methods and systems disclosed herein are not, however, limited to the examples of FIGS. 13 and 14.

Prototype Example

In a prototype example, a full length feature movie (video program) (2 hours and 25 minutes) was encoded at three bitrates: 8400 kbps, 5300 kbps, and 3500 kbps utilizing a 2-pass encoding process at a resolution of 1920×816 pixels and 24 frames per second. The PSNR for each frame was determined against the original source video, and the frames were grouped into clusters of 48 frames, corresponding to 2 seconds of video frames. From here, the lowest PSNR of the frames in a cluster was determined for each cluster, and a minimum PSNR of 40 dB was chosen as the least acceptable objective quality metric for a cluster. If the minimum PSNR for a cluster at a lower level was available, that cluster was swapped for the higher level cluster. This approach was used for 8400 kbps (using 8400 kbps, 5300 kbps, and 3500 kbps), and for 5300 kbps (using 5300 kbps and 3500 kbps). The results were an accumulative bandwidth savings of 36% for an 8400 kbps stream and 18% for a 5300 kbps stream, with minimal impact on perceptual quality.

System and Computer Block Diagrams

Figure 14:
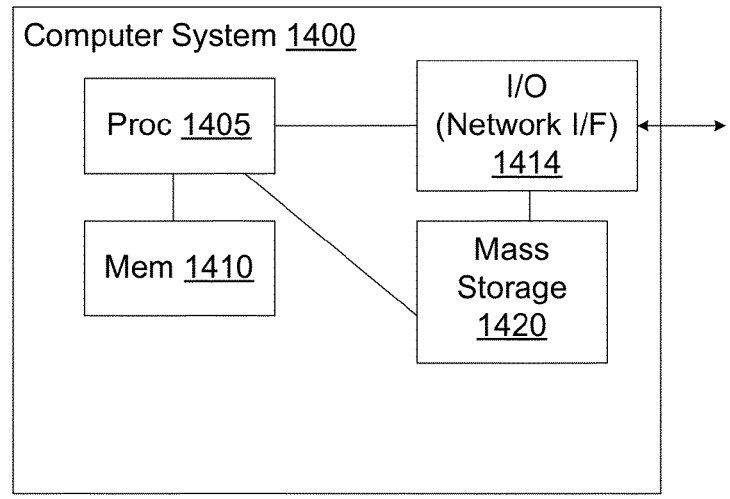
FIG. 14 is a block diagram of an example computer system corresponding to any network services, including a distributor in the network services.

FIG. 14 is a block diagram of an example computer system 1400 corresponding to any of services 102, including distributor 114. Computer system 1400, which may be, e.g., a server, includes one or more processors 1405, a memory 1410 in which instruction sets and databases for computer program applications are stored, a mass storage 1420 for storing, e.g., encoded programs and drop-level information, and an input/output (I/O) module 1415 through which components of computer system 1400 may communicate with networks 106.

Figure 15:
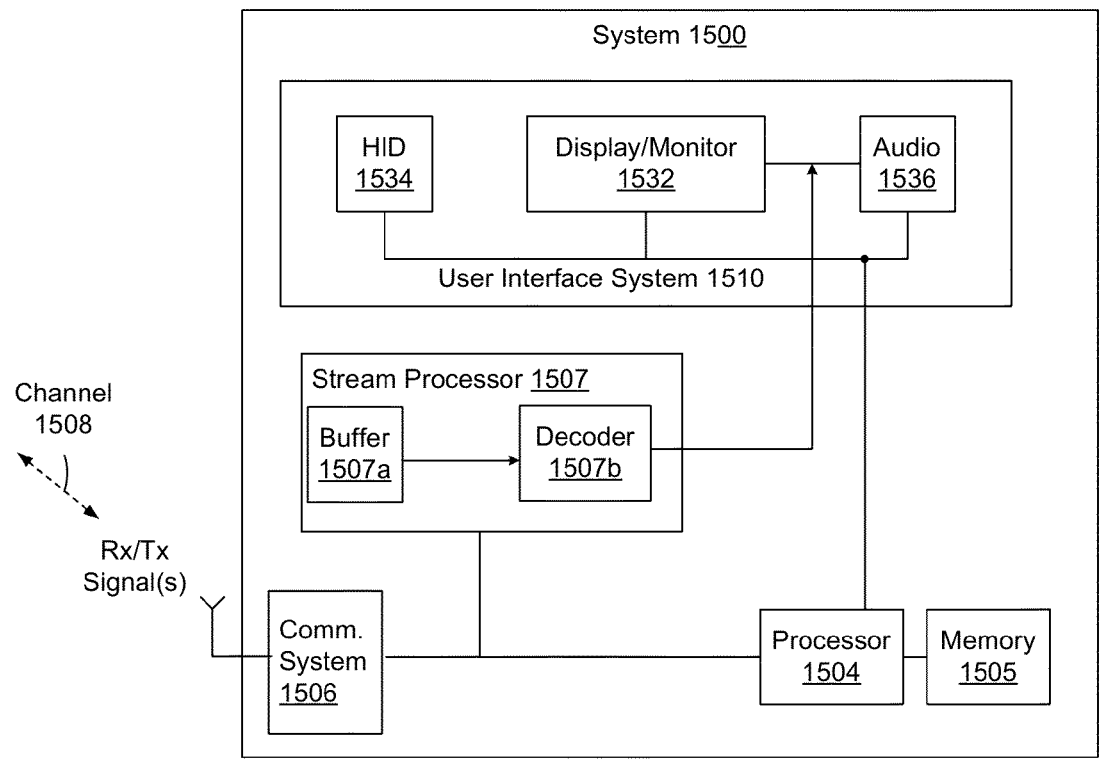
FIG. 15 is a block diagram of an example system representing a client device.

FIG. 15 is a block diagram of an example system 1500 representing, e.g., client device 104, and may be implemented, and configured to operate, as described in one or more examples herein.

System 1500 or portions thereof may be implemented within one or more integrated circuit dies, and may be implemented as a system-on-a-chip (SoC).

System 1500 may include one or more processors 1504 to execute client-side application programs stored in memory 1505.

System 1500 may include a communication system 1506 to interface between processors 1504 and communication networks, such as networks 106. Communication system 1506 may include a wired and/or wireless communication system.

System 1500 may include a stream processor 1507 to process program streams, received over channel 1508 and through communication system 1506, for presentation at system 1500. Stream processor 1507 includes a buffer 1507a to buffer portions of received, streamed programs, and a decoder 1507b to decode and decrypt the buffered programs in accordance with encoding and encryption standards, and using decryption keys. In an alternative embodiment, decoder 1507b may be integrated with a display and graphics platform of system 1500. Stream processor 1507 together with processors 1504 and memory 1505 represent a controller of system 1500. This controller includes modules to perform the functions of one or more examples described herein, such as a streaming module to stream programs through communication system 1506.

System 1500 may include a user interface system 1510.

User interface system 1510 may include a monitor or display 1532 to display information from processor 1504, such as client-side storefront GUIs.

User interface system 1510 may include a human interface device (HID) 1534 to provide user input to processor 1504. HID 1534 may include, for example and without limitation, one or more of a key board, a cursor device, a touch-sensitive device, and or a motion and/or image sensor. HID 1534 may include a physical device and/or a virtual device, such as a monitor-displayed or virtual keyboard.

User interface system 1510 may include an audio system 1536 to receive and/or output audible sound.

System 1500 may correspond to, for example, a computer system, a personal communication device, and/or a television set-top box.

System 1500 may include a housing, and one or more of communication system 1506, processors 1504, memory 1505, user interface system 1510, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1502 may be implemented to receive a digital television broadcast signal, and system 1500 may include a set-top box housing or a portable housing, such as a mobile telephone housing.

Accordingly, system 1500 may include, but is not limited to, stand-alone equipment, such as personal computers, laptops, ultrabooks, and tablets, and mobile phones and smartphones/Personal Digital Assistants (PDAs). System 150 may also represent and include a suite of interconnected devices, such a set-top box/video game console device, a remote to operate such a device, and an audio-visual display and/or computer. System 1500 may also represent and include (digital video disk) DVD and Blu-ray players, and televisions.

Figure 16:
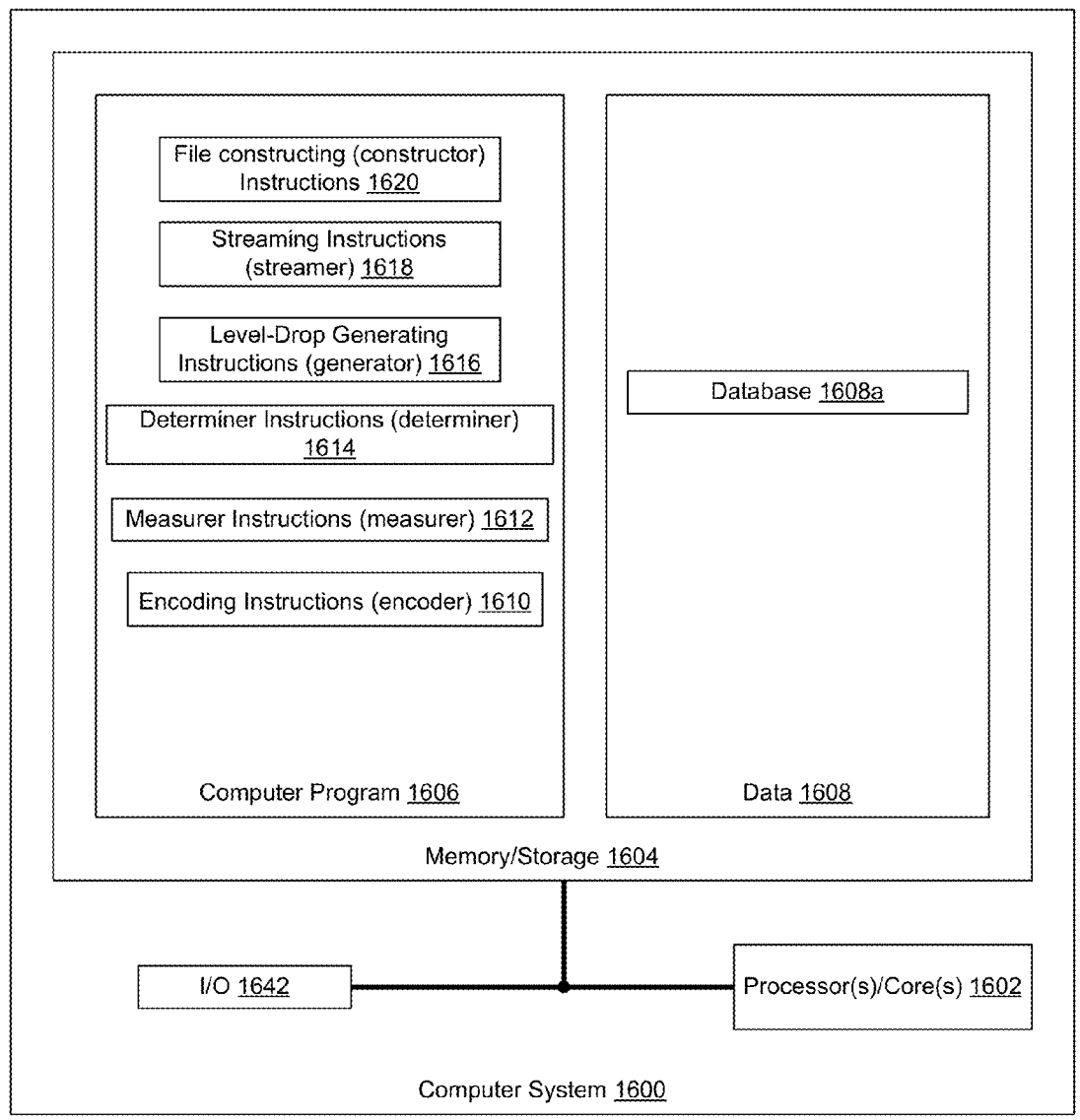
FIG. 16 is a block diagram of a computer system configured to perform processing of media/programs and adaptive streaming.

FIG. 16 is a block diagram of a computer system 1600, configured to perform processing of media/programs and adaptive streaming as described herein.

Computer system 1600 includes one or more computer instruction processing units and/or processor cores, illustrated here as processor 1602, to execute computer readable instructions, also referred to herein as computer program logic.

Computer system 1600 may include memory, cache, registers, and/or storage, illustrated here as memory 1604, which may include a non-transitory computer readable medium encoded with computer programs, illustrated here as computer program 1606.

Memory 1604 may include data 1608 to be used by processor 1602 in executing computer program 1606, and/or generated by processor 1602 during execution of computer program 1606. Data 1608 includes a database 1608*a* of container files and generated drop-level information for use in the methods described herein.

Computer program 1606 may include the following server-side instructions:

a. encoding instructions 1610 to cause processor 1602 to encode programs at different bitrates into different container files;

b. measurer instructions 1612 to measure objective quality levels of encoded video sections;

c. determiner instructions 1614 to cause processor 1602 to determine, based on the measured objective quality levels and a predetermined criterion of objective quality indicative of a relatively small difference in perceptual quality, swappable, co-located sections among the different container files, e.g., to determine replaceable sections and corresponding replacement sections;

d. generating instructions 1616 to generate level-drop information identifying the determined co-located swappable sections;

e. streaming instructions 1618 to stream the encoded programs, and swap the swappable sections as appropriate in the swapping-while-streaming embodiment; and f. file constructing instructions 1620 to construct a file from multiple files containing pre-swapped sections in the pre-swapped embodiment.

Figure 17:
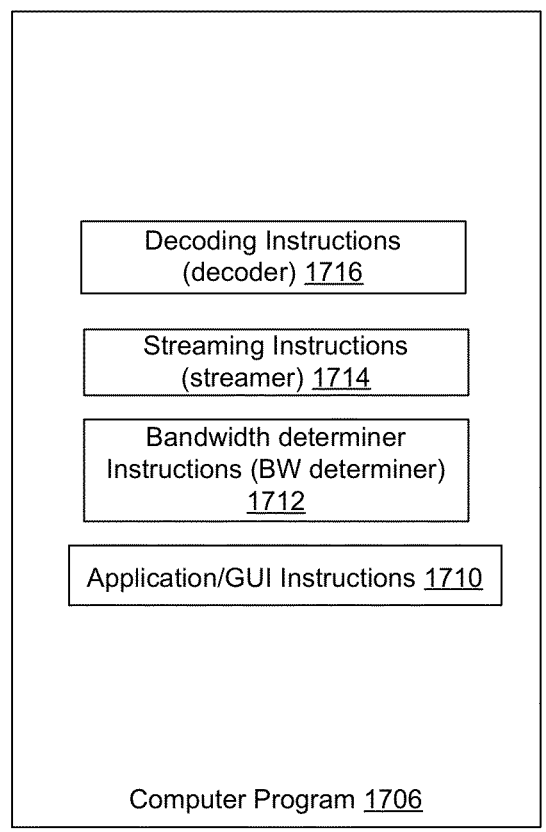
FIG. 17 is a block diagram of an example computer program hosted in a client-side computer system (e.g., client device) similar to the computer system of FIG. 14.

FIG. 17 is a block diagram of an example computer program 1706 hosted in a client-side computer system similar to computer system 1600. Computer program 1606 may include the following client-side instructions:

a. client-side application instructions 1710 to cause a client-side processor to communicate with corresponding server-side distributors, present corresponding client-side navigable GUIs, permit a user to select programs for presentation, and present streamed programs;

b. bandwidth determiner instructions 1712 to cause the processor to determine an available streaming bandwidth;

c. streaming instructions 1714 to cause the processor to initiate and maintain streaming of programs. Streaming instructions 1714 include instructions to cause the processor to identify swappable co-located sections from drop-level information received from a server-side peer and to stream the identified swappable sections accordingly; and d. decoding instructions 1716 to cause the processor to decode streamed programs.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

A method embodiment which may be performed at a network/server-side comprises:

encoding video at a first bitrate to produce first encoded sections;

encoding the video at a second bitrate that is less than the first bitrate to produce second encoded sections, each having encoded therein the video of a corresponding one of the first encoded sections;

measuring levels of objective quality, indicative of perceptual quality, of the first and second encoded sections;

determining, based on the measured objective quality levels, replaceable sections among the first encoded sections, and replacement sections among the second encoded sections, each to replace a corresponding one of the replaceable sections; and streaming the first encoded sections except for the replaceable sections, and the replacement sections instead of their corresponding replaceable sections.

The determining may include:

determining if corresponding first and second encoded sections have respective measured objective quality levels that each meet a predetermined criterion of objective quality; and declaring/identifying the corresponding first and second encoded sections as corresponding replaceable and replacement sections, respectively, if the respective measured objective quality levels each meet the predetermined criterion.

The predetermined criterion of objective quality may be indicative of an acceptable difference in the perceptual quality levels of the corresponding replaceable and replacement sections when decoded and presented.

The predetermined criterion of objective quality may be one of:

a threshold level of objective quality that must be exceeded by each of the respective measured objective quality levels; and a maximum difference between the respective measured objective quality levels that must not be exceeded.

In the method:

the measuring may include measuring a signal-to-noise ratio (SNR) as the objective quality level; and the determining may include determining whether the measured objective quality levels meet a predetermined criterion that is based on one of an absolute objective quality level and a relative objective quality level.

The method may further comprise:

constructing a first file containing the first encoded sections, including the replaceable sections;

constructing a second file containing the second encoded sections, including the replacement sections; and wherein the streaming includes:

streaming the first encoded sections, except for the replaceable sections, from the first container file; and streaming the replacement sections from the second container file.

The method may further comprise:

generating identifying information that identifies the replaceable sections and their corresponding replacement sections in the first and second container files, respectively; and streaming the identifying information.

The method may further comprise constructing a file containing the first encoded sections, except for the replaceable sections which are replaced by their corresponding replacement sections, wherein the streaming includes streaming from the file the first encoded sections, except for the replaceable sections, and the replacement sections.

Computer program product and apparatus embodiments correspond to the above-recited method embodiment.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A method of streaming video, the method performed by a streaming client device in communication with a distributor system, comprising:

requesting to stream a video from a distributor system using a streaming client device;

receiving an index to multiple files containing a plurality of streams of video encoded at different bitrates from the distributor system using the streaming client device, the plurality streams including at least a first stream comprising frames of a video encoded at a first bitrate and a second stream comprising frames of the video encoded at a second bitrate that is less than the first bit rate;

receiving identifying information that identifies replaceable sections from at least the first stream from the distributor system using the streaming client device, wherein a replaceable section has a particular time period in a stream during which a replacement section from a different stream can be streamed;

receiving identifying information that identifies replacement sections from at least the second stream from the distributor system using the streaming client device, wherein a replacement section comprises content encoded using different encoding parameters and for playback during a corresponding replaceable section, and wherein each replaceable section has been determined to be replaceable with a corresponding replacement section by the distributor system based on measured differences between respective levels of objective quality of the corresponding sections according to at least one predetermined criterion of objective quality;

determining an available streaming bandwidth using the streaming client device;

selecting a stream from the plurality of streams indicated in the received index based on the determined streaming bandwidth using the streaming client device;

when the received identifying information identifies that a next section to be streamed from the selected stream is a replaceable section, requesting a replacement section from a different stream for playback during the corresponding replaceable section from the selected stream from the distributor system using the streaming client device, wherein the replacement section is played back at a same time as the replaceable section would have been played back had the corresponding replaceable section not been replaced; and when the received identifying information identifies that the next section to be streamed from the selected stream is not a replaceable section, requesting the next section from the selected stream from the distributor system using the streaming client device.

2. The method of claim 1, further comprising:

decoding the requested next section to recover the video encoded therein using the streaming client device; and presenting the recovered video using the streaming client device.

3. The method of claim 1, wherein the at least one predetermined criterion of objective quality, if met, translates to an acceptable difference in perceptual quality levels of the video when decoded from the corresponding replaceable and replacement sections, and then presented.

4. The method of claim 1, wherein the replacement sections include:

first replacement sections encoded at a second bit rate that is less than the first bitrate; and second replacement sections encoded at a third bitrate that is less than the second bitrate.

5. The method of claim 1 further comprising streaming sections of video except for the replaceable sections using the streaming client device, wherein the streaming includes:

streaming first sections except for the replaceable sections from a first file containing the first sections and the replaceable sections using the streaming client device; and streaming the replacement sections instead of the replaceable sections from a second file containing the replacement sections using the streaming client device.

6. The method of claim 1, wherein the received identifying information is level-drop information that identifies the replaceable and replacement sections.

7. The method of claim 5, wherein the streaming includes transmitting requests for sections of video using the streaming client device and receiving the requested sections of video using the streaming client device.

8. The method of claim 1, wherein each of the measured differences between respective levels of objective quality is based on a signal to noise ratio (SNR) and the predetermined criterion is based on a one of an absolute SNR level and a relative SNR between the measured differences between respective levels of objective quality.

9. A non-transitory computer readable medium encoded with a computer program, the computer program for execution by a streaming client device that includes a processor, the computer program including instructions to cause the processor to:

request to stream a video;

receive an index to multiple files containing a plurality of streams of video encoded at different bitrates, the plurality streams including at least a first stream comprising frames of a video encoded at a first bitrate and a second stream comprising frames of the video encoded at a second bitrate that is less than the first bit rate;

receive identifying information that identifies replaceable sections from at least the first stream, wherein a replaceable section has a particular time period in a stream during which a replacement section from a different stream can be streamed;

receive identifying information that identifies replacement sections from at least the second stream, wherein a replacement section comprises content encoded using different encoding parameters and for playback during a corresponding replaceable section, and wherein each replaceable section has been determined to be replaceable with a corresponding replacement section by a distributor system based on measured differences between respective levels of objective quality of the corresponding sections according to at least one predetermined criterion of objective quality;

determine an available streaming bandwidth;

select a stream from the plurality of streams indicated in the received index based on the determined streaming bandwidth;

when the received identifying information identifies that a next section to be streamed from the selected stream is a replaceable section, request a replacement section from a different stream for playback during the corresponding replaceable section from the selected stream, wherein the replacement section is played back at a same time as the replaceable section would have been played back had the corresponding replaceable section not been replaced; and when the received identifying information identifies that the next section to be streamed from the selected stream is not a replaceable section, request the next section from the selected stream.

10. The computer readable medium of claim 9, wherein the at least one predetermined criterion of objective quality, if met, translates to an acceptable difference in perceptual quality levels of the video decoded from the corresponding replaceable and replacement sections, and then presented.

11. The computer readable medium of claim 9, wherein the replacement sections include:

first replacement sections encoded at a second bit rate that is less than the first bitrate; and second replacement sections encoded at a third bitrate that is less than the second bitrate.

12. The computer readable medium of claim 9 further comprising a set of instructions to cause the processor to stream sections of video except for the replaceable sections, wherein the set of instructions to cause the processor to stream include instructions to cause the processor to:

stream first sections except for the replaceable sections from a first file containing the first sections and the replaceable sections; and stream the replacement sections instead of the replaceable sections from a second file containing the replacement sections.

13. The computer readable medium of claim 9, wherein the received identifying information is level-drop information that identifies the replaceable and replacement sections.

14. The computer readable medium of claim 12, wherein the set of instructions to cause the processor to stream include instructions to cause the processor to transmit requests for sections of video and receive the requested sections of video.

15. The computer readable medium of claim 9, wherein each of the measured differences between respective levels of objective quality is based on a signal to noise ratio (SNR) and the predetermined criterion is based on a one of an absolute SNR level and a relative SNR between the measured differences between respective levels of objective quality.

16. A streaming client apparatus, comprising:

a processor;

a memory storing an application;

wherein the application directs the processor to:

request to stream a video from a distributor system;

receive an index to multiple files containing a plurality of streams of video encoded at different bitrates from the distributor system, the plurality streams including at least a first stream comprising frames of a video encoded at a first bitrate and a second stream comprising frames of the video encoded at a second bitrate that is less than the first bit rate;

receive identifying information that identifies replaceable sections from at least the first stream from the distributor system, wherein a replaceable section has a particular time period in a stream during which a replacement section from a different stream can be streamed;

receive identifying information that identifies replacement sections from at least the second stream from the distributor system, wherein a replacement section comprises content encoded using different encoding parameters and for playback during a corresponding replaceable section, wherein each replaceable section has been determined to be replaceable with a corresponding replacement section by a distributor system based on measured differences between respective levels of objective quality of the corresponding sections according to at least one predetermined criterion of objective quality;

determine an available streaming bandwidth;

select a stream from the plurality of streams indicated in the received index based on the determined streaming bandwidth;

when the received identifying information identifies that a next section to be streamed from the selected stream is a replaceable section, request a replacement section from a different stream for playback during the corresponding replaceable section from the selected stream from the distributor system, wherein the replacement section is played back at a same time as the replaceable section would have been played back had the corresponding replaceable section not been replaced; and when the received identifying information identifies that the next section to be streamed from the selected stream is not a replaceable section, request the next section from the selected stream from the distributor system.

17. The streaming client apparatus of claim 16, wherein the at least one predetermined criterion of objective quality, if met, translates to an acceptable difference in perceptual quality levels of the video decoded from the corresponding replaceable and replacement sections, and then presented.

18. The streaming client apparatus of claim 16, wherein the replacement sections include:

first replacement sections encoded at a second bit rate that is less than the first bitrate; and second replacement sections encoded at a third bitrate that is less than the second bitrate.

19. The streaming client apparatus of claim 16, wherein the application further directs the processor to:

stream first sections of video except for the replaceable sections from a first file containing the first sections and the replaceable sections; and stream the replacement sections instead of the replaceable sections from a second file containing the replacement sections.

20. The streaming client apparatus of claim 16, wherein the received identifying information is level-drop information that identifies the replaceable and replacement sections.

21. The streaming client apparatus of claim 16, wherein the application further directs the processor to:

stream sections of video;

transmit requests for the sections of video; and receive the requested sections of video.

22. The streaming client apparatus of claim 16, wherein each of the measured differences between respective levels of objective quality is based on a signal to noise ratio (SNR) and the predetermined criterion is based on a one of an absolute SNR level and a relative SNR between the measured differences between respective levels of objective quality.

23. The streaming client apparatus of claim 16, further comprising:

a user interface system;

a communication system to communicate with a network; and a housing to house the processor and memory, the communication system, and the user interface system.

24. The streaming client apparatus of claim 23, wherein:

the communication system includes a wireless communication system; and the housing includes a mobile hand-held housing to receive the processor and memory, the user interface system, the communication system, and a battery.

\* \* \* \* \*